United States Patent [19]

Satake et al.

[11] Patent Number: 5,254,894
[45] Date of Patent: Oct. 19, 1993

[54] DUAL-STATOR INDUCTION SYNCHRONOUS MOTOR

[75] Inventors: Toshihiko Satake, Higashihiroshima; Yukio Onogi, Hiroshima, both of Japan

[73] Assignee: Satake Engineering Co., Ltd., Tokyo, Japan

[21] Appl. No.: 706,009

[22] Filed: May 28, 1991

[30] Foreign Application Priority Data

May 26, 1990 [JP] Japan .................. 2-136381
Jun. 27, 1990 [JP] Japan .................. 2-170470

[51] Int. Cl.⁵ .............. H02K 16/00; H02K 16/04; H02K 19/10; H02K 19/14
[52] U.S. Cl. .................. 310/114; 310/113; 310/162
[58] Field of Search .......... 310/68 R, 68 D, 68 A, 310/112, 113, 114, 126, 161, 162, 163, 166, 167, 200

[56] References Cited

U.S. PATENT DOCUMENTS

| | | | |
|---|---|---|---|
| 3,114,094 | 12/1963 | Lee | 310/68 D |
| 3,467,844 | 9/1969 | Bird | 310/168 |
| 3,573,578 | 4/1971 | Shibata | 310/185 |
| 4,019,104 | 4/1977 | Parker | 310/113 |
| 4,785,213 | 11/1988 | Satake | 310/114 |
| 4,959,578 | 9/1990 | Varga | 310/114 |
| 5,012,148 | 4/1991 | Vithayathil | 310/162 |

FOREIGN PATENT DOCUMENTS

2809267 9/1978 Fed. Rep. of Germany ...... 310/162
49-86807 9/1974 Japan .................. 310/114
54-29005 3/1979 Japan .................. 310/114

*Primary Examiner*—Steven L. Stephen
*Assistant Examiner*—C. LaBalle
*Attorney, Agent, or Firm*—Fish & Richardson

[57] ABSTRACT

An induction synchronous motor with two rotor cores and two stator cores includes a rotor having two mutually connected first rotor windings (31,31) of a predetermined number of poles and two mutually connected second rotor windings (33,34) connected of a different number of poles with respect to the number of poles of the first rotor windings; and two stators having two stator windings (21,22) of the number of poles identical with the number of poles of the first rotor windings (31,32) and two excitation windings (41,42) of the number of poles identical with the number of poles of the second rotor windings (33,34). The motor further includes a rectifier circuit (35) for rectifying outputs from the second rotor windings (33,34) and supplying the rectified voltages to the first rotor windings (31,32) at a synchronous operation. A phase shifter (SW1) associated with the first stator windings (21,22) produces a phase difference of 180° between a rotating magnetic field around one of the rotor cores and that around the other one of the rotor cores. The motor starts based on a theory of an ordinary induction motor under a phase difference of 0° and can operate as a synchronous motor after the rotating speed has reached its synchronous speed under the phase difference of 180° produced by the phase shifter.

9 Claims, 6 Drawing Sheets

DUAL-STATOR INDUCTION SYNCHRONOUS MOTOR

BACKGROUND OF THE INVENTION

The present invention relates to a synchronous motor.

Generally, a synchronous motor requires a starting means for accelerating its rotor to a rotating speed of rotating magnetic fields produced by stator windings, that is, approximately to a synchronous speed, and a means for effecting DC excitation of rotor windings for the normal running operation.

An induction synchronous motor has been devised for omitting a starting means and having the synchronous motor itself to posses a starting torque so that the motor can first start as an induction motor with the rotor windings being short-circuited whereby no special means for starting the motor is required. However, such a motor requires brushes since the rotor windings must be excited by DC current for synchronous operation of the motor. When the rotating speed of the rotor approaches the synchronous speed, the short-circuiting of the rotor windings is released so that the DC current is allowed to flow to the rotor windings through the brushes from the external DC current power source thereby producing magnetic poles in the rotor. These magnetic poles are attracted by the rotating magnetic fields produced by the stator windings so that the rotor is caused to be rotated at a synchronous speed. The brushes require maintenance checks resulting in extra costs for maintenance so that the development of a synchronous motor having a brushless configuration is strongly desired.

As conventional synchronous motors having a brushless configuration, there are motors of permanent magnet types or reluctance types but these are all limited to small capacity motors because induction starting is not possible and the starting torque is small. Such motors of an inductor type have disadvantages because magnetic passages therein are complex resulting in an increase in the size of the motors. The same is true in the motors using therein an AC exciter and a rotary rectifier means. A three-phase synchronous motor of a brushless type utilizing a harmonic magnetic field through a square wave voltage of an invertor by having a diode connected to the rotor windings has a disadvantage in that the magnetic magnetizing power of the rotor is insufficient and the output is not strong enough.

Further, Japanese Patent Application Kokoku No. Sho 54(1979)-34,124 discloses an arrangement wherein the starting is effected according to the induction motor theory and the synchronous operation is effected by having the DC magnetic fields formed in the axial direction thereby causing the rotor cores to form magnetic poles. This has a drawback in that the torque produced is asymmetrical with respect to the rotary axis, thereby causing the axis to vibrate.

Also, Japanese Patent Application Kokoku No. Sho 61(1986)-1,992 discloses an arrangement wherein there are two rotating magnetic fields of four poles and eight poles which do not interfere with each other and two phases of the three-phase rotor windings are for the synchronous operation and the remaining one phase is used for the starting operation with the rotor windings of this one phase being short-circuitted. However, a disadvantage therein is that the starting torque may tend to be small.

SUMMARY OF THE INVENTION

Therefore, an object of the present invention is to provide a synchronous motor which can produce a large starting torque and a large synchronous torque but which does not require brushes or any exclusive starting means so that the motor can be simple in its configuration and easy in maintenance.

In carrying out the above and other objects of the invention, there is provided, in one form, a dual-stator induction synchronous motor having two rotor cores mounted on a common axis with a predetermined space provided therebetween and two stator cores respectively facing the two rotor cores, the motor characterized by comprising:

a rotor having two first rotor windings of a predetermined number of poles provided respectively on the two rotor cores and two second rotor windings of a different number of poles with respect to the number of poles of the first rotor windings provided respectively on the two rotor cores, the two first rotor windings being connected together and the two second rotor windings being connected together between the two rotor cores;

two stators each having two rotor windings provided respectively on the two stator cores and having the number of poles identical with the number of poles of the first rotor windings and two DC excitation windings provided respectively on the two stator cores and having the number of poles identical with the number of poles of the second rotor windings;

a rectifier circuit for rectifying outputs from the second rotor windings and supplying the rectified voltages to the first rotor windings, the first rotor windings and the second rotor windings having connecting portions therebetween and the rectifier circuit being provided between the connecting portions; and a phase shifting means for producing a phase difference of 180° between a rotating magnetic field produced around one of the rotor cores facing one of the two stators and a rotating magnetic field produced around the other one of the two rotor cores facing the other one of the two stators.

According to another aspect of the invention, there is provided a dual-stator induction synchronous motor having two rotor cores mounted on a common axis with a predetermined space provided therebetween and two stator cores respectively facing the two rotor cores, the motor comprising:

a rotor having two first rotor windings of a predetermined number of poles provided respectively on the two rotor cores and two second rotor windings of a number of poles twice the number of poles of the first rotor windings provided respectively on the two rotor cores, the two first rotor windings being connected together and the two second rotor windings being connected together between the two rotor cores;

two stators each having two stator cores respectively facing the two rotor cores and having two stator windings each having two windings provided per phase and connected in parallel with each other with these two stator windings being disposed respectively on the two stator cores and the two stator windings having the number of poles identical with that of the first rotor windings, the two windings each having at an intermediate portion thereof a excitation voltage input node;

a excitation voltage generating circuit for producing excitation voltages and supplying them to the excitation voltage input nodes of the stator windings;

a rectifier circuit for rectifying outputs from the second rotor windings and supplying the rectified voltages to the first rotor windings, the first rotor windings and the second rotor windings having connecting portions therebetween and the rectifier circuit being provided between the connecting portions; and a phase shifting means for producing phase difference of 180° between a rotating magnetic field produced around one of the rotor cores facing one of the two stators and a rotating magnetic field produced around the other one of the two rotor cores facing the other one of the two stators.

With reference to the functions or operation of a phase shifting device for a multiple stator induction motor, the applicant of the present application has given a full explanation thereon in Japanese Patent Application No. Sho 61(1986)-128,314.

In respect of the present invention, however, explanation herein relates to an arrangement wherein the voltage phase shifting means causes the phase difference to be 0° during the starting operation and to be 180° during the synchronous operation.

In the arrangement according to the present invention, between the first rotor windings and the second rotor windings which have a different number of poles with respect to the poles of the first rotor windings and between the stator windings having the same number of poles as that of the first rotor windings and the DC excitation windings having the same number of poles as that of the second rotor windings, only those stators and rotors which have the same number of poles react with each other and the rotating magnetic fields of the stator windings in no way react with the second rotor windings having a different number of poles. The principle itself on which the present invention is based has been known.

According to the present invention, the rotor start rotating as the magnetic field produced by the stator windings causes inducing a voltage in the first rotor windings having the same number of poles as that of the stator windings and this induction is without affecting the second rotor windings having a different number of poles as that of the stator windings.

Here, the phase shifting means operates such that the voltages induced in the first rotor windings wound respectively on the two rotor cores may be the same phase, that is, such that the current may circulate in the first rotor windings respectively wound on the two rotor cores. The motor thus starts in the same way as an ordinary induction motor.

After the start of the motor, as the rotating speed of the rotor increases and approaches a rotating speed of the rotating magnetic fields, that is, a synchronous speed, the voltages at the rotor conductive members induced by the rotating magnetic fields become small. The operation up to this point is that of an induction motor but this changes to a synchronous operation when the slip S approaches S=0.05. How this change takes place is explained.

First, the voltage phase shifting means is operated in such a way that a phase difference of 180° is developed between the rotating magnetic fields produced around the rotor core faced by one of the two stators and the rotating magnetic fields produced around the rotor core faced by the other of the two stators.

In this way, the current that has been flowing in circulation through the first rotor windings wound respectively on the two rotor cores no longer flows there but starts flowing to the rectifier circuit provided between a junction of the first rotor windings and a junction of the second rotor windings.

The current which has been flowing in the first rotor windings due to the rotating magnetic fields having a phase difference of 180° no longer flows therein as the slip S becomes zero when the rotor enters into the synchronous speed.

According to the first embodiment of the invention, at the same time as the voltage phase shifting means operates, the DC excitation voltage is supplied to the DC excitation windings. As a consequence, there are produced static magnetic fields due to this DC excitation voltage. Since these static magnetic fields result in the same number of poles as that of the second rotor windings of the rotor, they do not affect the first rotor windings which have a different number of poles and the second rotor windings induce AC voltages by intersecting the static magnetic fields. The AC voltages become larger as the rotational speed of the rotor becomes larger. Also, as explained above, due to the phase difference of 180° in the rotating magnetic fields and the AC voltages induced, the current does not circulate in the second rotor windings wound respectively on the two rotor cores but flows to the rectifier circuit provided at the junction portions between the first and second rotor windings. When the current rectified by the rectifier circuit is inputted as an output of the rectifier circuit to the first rotor windings, the first rotor windings form magnetic poles and are attracted by the rotating magnetic fields of the stator windings having the same number of poles, which allows the rotor to rotate in a synchronous speed. Under the above state, since the second rotor windings are under the control of the DC magnetic fields by the DC excitation windings having the same number of poles, and the first rotor windings are under the control of the stator windings having the same number of poles, it is evident that they do not interfere with each other.

Now, consideration is given to the synchronous torque. The phase of the rotating magnetic fields produced by the particular stator windings is shifted by 180° with respect to that of the rotating magnetic fields produced by the other stator windings. The direction of the flow of the current which flows in the second rotor windings of the rotor core faced by one of the stators by the static magnetic fields produced by the DC excitation windings and the direction of the flow of the current flowing in the second rotor windings of that rotor which is faced by the other of the stators are opposite to each other. However, they both flow to the rectifier circuit thereby forming four magnetic poles in the first rotor windings and the number of these magnetic poles is the same as that of the rotating magnetic fields produced by the stator windings. Thus, although the induction motor according to the present invention has two stators, the capacity of the motor in the sum due to the added effect of the two rotor windings is the same as that of a conventional induction motor having brushes.

According to the second embodiment of the invention, at the same time as the voltage phase shifting means operates, the DC excitation voltage is inputted between intermediate points of the two windings wound for each phase of the stator windings and, due to this DC excitation voltage, there are produced static magnetic fields having the number of poles twice that of the stator windings.

Since these static magnetic fields result in the same number of poles as that of the second rotor windings of the rotor, they do not affect the first rotor windings which have a different number of poles and the second rotor windings intersect these static magnetic fields thereby inducing AC voltages. With an increase in the rotational speed, there is an increase in the induced AC voltages.

Also, as explained above, due to the phase difference of 180° in the rotating magnetic fields and the DC voltage induced, the current does not circulate in the second rotor windings wound respectively on the two rotor cores but flows to the rectifier circuit provided between the junction portions between the first and second rotor windings.

When the current rectified by the rectifier circuit is inputted as an output of the rectifier circuit to the first rotor windings, the first rotor windings form magnetic poles and are attracted by the rotating magnetic fields of the stator windings having the same number of poles, which allows the rotor to rotate in a synchronous speed.

Next, according to the third and the fourth embodiment of the invention, at the same time as the voltage phase shifting means operates, the AC voltage is inputted between the intermediate points of the two windings wound for each phase of the stator windings and, due to this AC voltage, there are produced a second rotating magnetic fields having the number of poles twice that of the stator windings.

Since these second rotating magnetic fields result in the same number of poles as that of the second rotor windings of the rotor, they do not affect the first rotor windings which have a different number of poles but react only with the second rotor windings.

Here, since the second rotor windings are being rotated in the same direction as the first rotor windings, when the second rotating magnetic fields are seen from the rotating magnetic fields of four poles produced by the stator windings as reference, the slip S thereof is S=0.5 in the case where the direction of the phase rotation of the second rotating magnetic fields is the same as that of the rotating magnetic fields produced by the stator windings, and S=1.5 in the case where the direction of the phase rotation of the second rotating magnetic fields is opposite to that of the rotating magnetic fields produced by the stator windings. The second rotor windings intersect the second rotating magnetic fields and AC voltages are induced therein.

Also, as explained above, due to the phase difference of 180° in the rotating magnetic fields and the DC voltage induced, the current does not flow to circulate in second rotor windings wound respectively on the two rotor cores but flows to the rectifier circuit provided at the junction portions between the first and second rotor windings.

When the current rectified by the rectifier circuit is inputted as an output of the rectifier circuit to the first rotor windings, the first rotor windings form magnetic poles and are attracted by the rotating magnetic fields of the stator windings having the same number of poles, which allows the rotor to rotate in a synchronous speed.

Under the above state, since the second rotor windings are under the control of the second rotating magnetic fields having the same number of poles due to AC voltages and the first rotor windings are under the control of the stator windings having the same number of poles, it is evident that they do not interfere with each other.

As to the voltage phase shifting means, the applicant of the present application has disclosed in Japanese Patent Application No. Sho 61(1986)-128,314 two methods of effecting the shift, one for changing the relative positions of the two stators by mechanically rotating one or both the stators about its rotary axis and the other for switching the connections of the stator windings.

One of the most important operations in the synchronous motor according to the present invention is that, when the motor changes into its synchronous operation after starting, the phase difference of the two rotating magnetic fields is to be changed from 0° to 180° and it is desired that this change is effected instantaneously. Such change to the synchronous speed is facilitated if the inputting of the excitation voltage according to any one of the three described embodiments to the intermediate points of the two windings per phase in the respective stator windings and the changing of the abovementioned phase difference are effected simultaneously and instantaneously.

Now, in order to set the phase difference between the rotating magnetic fields respectively produced by the two stators to 180°, that is, to set the phase difference to 180° between the phase of the excitation voltage inputted at the intermediate points of the per-phase windings in one of the stators and the phase of the excitation voltage inputted at the intermediate points of the per-phase windings in the other of the stators, it is facilitated if the related windings are connected in advance in such a way that the phase difference between one of the excitation voltage and the other of such voltage will be 180°.

By arranging as above, it is possible to realize a synchronous motor which has a large synchronous torque, which does not require brushes or other maintenance means, which is simple in construction and which does not require any starting means.

As to the power supply for effecting magnetization of the stator windings, the power supply source can be an AC power source of a commercial frequency or a variable frequency power supply utilizing an invertor. The phase may either be a single phase or poly-phases. When the variable frequency power supply is used, it is possible to vary the synchronous speed and, even in such a case, the motor can start with a starting torque as in an ordinary induction motor. The present invention can, thus, provide a synchronous motor opened to a variety of uses and adapted to low cost manufacturing.

BRIEF DESCRIPTION OF THE DRAWINGS

FIG. 1, consisting of FIGS. 1(a) and 1(b), is a diagram showing the stator windings side and the rotor windings side of the first embodiment of the invention;

FIG. 3, consisting of FIGS. 3(a) and 3(b), is a diagram showing the stator windings side and the rotor windings side of the second embodiment of the invention;

FIG. 8, consisting of FIGS. 8(a) and 8(b), is a diagram showing the stator windings side and the rotor windings side of the motor in which the second rotor windings and the excitation windings are single-phase windings.

PREFERRED EMBODIMENTS OF THE INVENTION

The present invention will now be explained as relating mainly to an induction synchronous motor having two stators but, of course, the number of the stators is not limitative. Also, the connections of stator windings may be any of parallel, serial, star or delta connections. Further, the phase may be any of single-phase, two-phases, three phases or poly-phases. The same is also true for the rotor windings.

The applicant of the present invention has disclosed in Japanese Patent Application No. Sho 61(1986)-128,314 a configuration and function of an induction motor having a plurality of stators which is partly incorporated in the present application.

The above patent application explains that, where the voltage phase shifting means sets a phase difference to, for example, the same phase or 0° in electrical angle between the rotating magnetic fields produced around the rotor faced by a particular one of a plurality of stators and the rotating magnetic fields produced around the rotor faced by the other of the stators, the current which flows to the rotor conductive members circulates in the rotor conductive members. However, if the electrical angle is 180°, the current to flow to the rotor conductive members does not circulate in the rotor conductive members but flows through the connecting members interconnecting the rotor conductive members between the rotor cores.

The configuration of the phase shifting means is also shown in the above patent application, in which the stator is rotated or the connections of the stator windings are switched for effecting the phase shifting. According to the present invention, the configuration of the phase shifting means is specially one in which the connections of the stator windings are changed or switched and, in this way, the switching from the electrical angle 0° to 180° can be effected instantaneously thereby facilitating the switching to the synchronous operation. Where there are provided a sensor for detecting the speed of rotation and a control means for the excitation circuit and the voltage phase shifting means, it is possible to automate the changing of the speeds to a synchronous speed after starting and also, even if the motor steps out during the operation, the signals from the sensor for detecting the speeds can immediately switch the synchronous operation to an operation as an induction motor. Unlike in an ordinary synchronous motor, the step-out does not cause a sudden stop of the motor so that an accident otherwise may occur can easily be avoided.

Figure 1A:
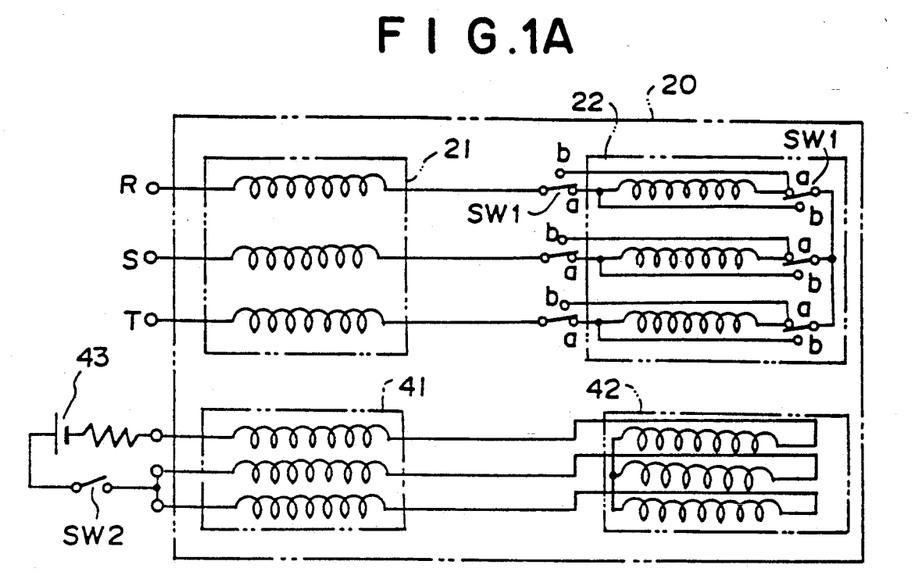
Figure 1B:
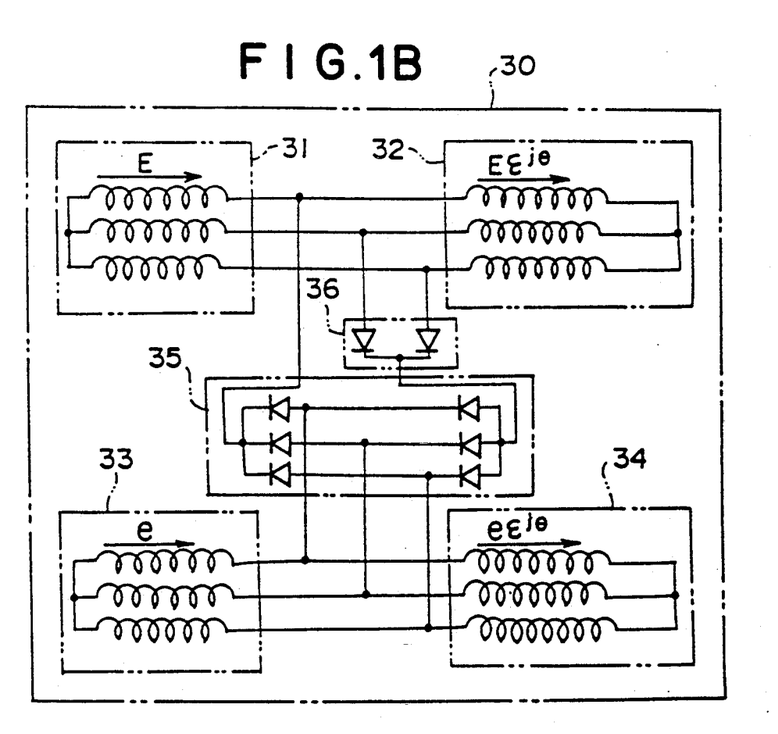

Now, explanation is made of a first embodiment according to the present invention with reference to FIG. 1. Numeral 20 represents an arrangement at the stator side of a dual-stator induction synchronous motor of the invention and the numeral 30 represents likewise an arrangement at the rotor side thereof.

At the stator side 20, there are provided stator windings 21 and 22 respectively on two stator cores. These stator windings 21 and 22 are in series Y-connection and connected respectively to three-phase AC power sources R, S and T. There are also provided direct current excitation windings 41 and 42 respectively on the two stator cores. At the rotor side 30, on the two rotor cores disposed on the common axis with a predetermined space being provided therebetween, there are provided respectively first rotor windings 31 and 32. These first rotor windings 31 and 32 are connected with each other in parallel. Also, on the two rotor cores, there are respectively provided second rotor windings 33 and 34. These second rotor windings 33 and 34 are also connected with each other in parallel.

The number of poles of the first rotor windings 31, 32 and the number of those of the stator windings 21, 22 are both identically four, and also the number of poles of the second rotor windings 33, 34 and the number of those of the direct current excitation windings 41, 42 are both identically eight. At the portions of the rotor windings which are disposed at a position between the two rotor cores not facing the two stator cores, there is provided a rectifier circuit 35 which rectifies an output of the second rotor windings 33, 34. The rectifier circuit 35 has its output terminals at the DC current side connected to the first rotor windings 31, 32 through diodes 36.

Here, it is assumed that the voltage induced in the first rotor windings 31 facing the stator windings 21 is in the direction shown by an arrow E in FIG. 1 and, similarly, the voltage induced in the second rotor windings 33 is in the direction shown by an arrow e. Further, it is assumed that the voltage induced in the second rotor windings 32 facing the stator windings 22 is in the direction shown by an arrow $E\epsilon^{j\theta}$ and, similarly, the voltage induced in the second rotor windings 34 is in the direction shown by an arrow $e\epsilon^{j\theta}$. Here, $\theta$ is a phase difference angle of the voltages.

Now, how the motor having the above arrangement will operate is explained. First, for starting the motor, the three-phase AC power sources are switched on in the state in which the stator windings 21, 22 are connected such that the phase difference angle $\theta$ of the induction voltages of the first rotor windings 31, 32 is rendered to be $\theta = 0°$. In this way, the three-phase AC current flows to the stator windings 21, 22 from the three-phase AC power sources so that there are respectively produced rotating magnetic fields of the same phase and the voltages E, $E\epsilon^{j\theta}$ are induced in the first rotor windings 31, 32. Since the phase difference angle $\theta$ is $\theta = 0°$ in the induction voltage, the current which flows in the first rotor windings 31, 32 circulates in both the windings and this causes the rotor to rotate and start the motor according to the principle of the induction motor (see FIG. 2). Here, since the number of the poles of the second rotor windings 33, 34 is eight and that of the stator windings 21, 22 is four, there are no interferences between them and hence the rotating magnetic fields generated by the stator windings 21, 22 produce no voltage in the second rotor windings 33, 34. Thus, the second rotor windings 33, 34 play no role in the start of motor. That is, since the start of motor is in the same characteristics as in a conventional induction motor, the starting torque is large and this is without requiring any such separate starting means as a starter.

After the start, the rotation speed of the rotor increases and, as it approaches the rotation speed of the rotating magnetic fields of the four poles produced by the stator windings 21, 22, that is, the synchronous speed of the four poles, the slip S decreases and the induced voltage E in the first rotor windings 31, 33 becomes small. The operation up to this point is an operation as that of an induction motor but, when the slip S approaches S=0.05, the operation changes to a synchronous operation. How this change takes place is explained hereunder.

Figure 2:
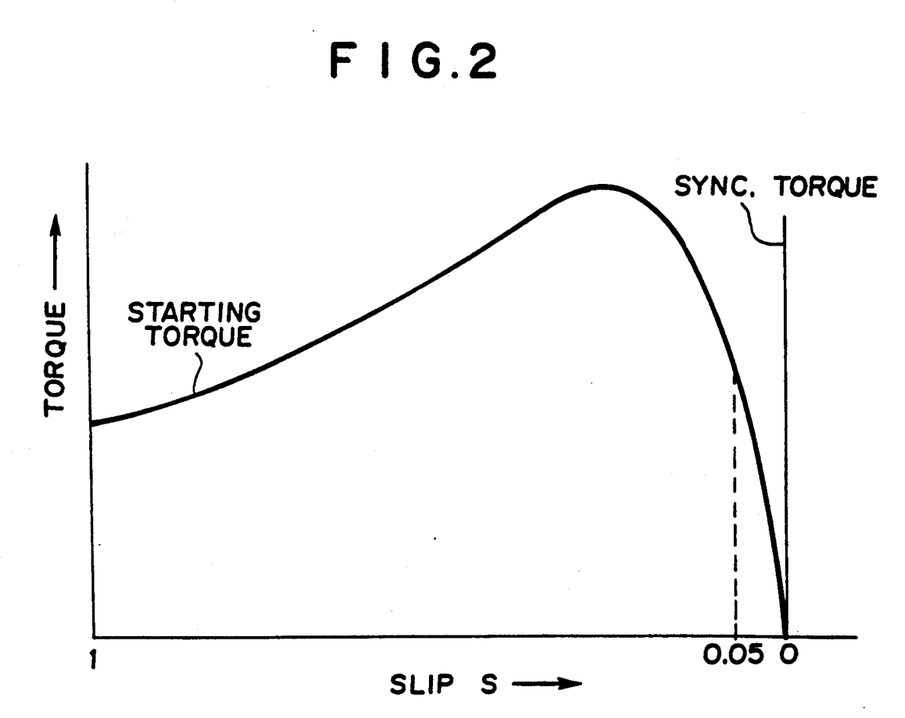
FIG. 2 is a torque characteristic curve of the motor shown in FIG. 1.

First, by means of the voltage phase shifting means, the connections of one of the two stator windings 21 and 22, for example, the stator windings 22, are changed by having the connections of a switch SW1 switched from an a-contact to a b-contact so as to set the phase difference angle $\theta$ in the two rotating magnetic fields produced by the two stator windings 21, 22 to $\theta=180°$. In this manner, the phase difference angle $\theta$ of the voltages induced in the first rotor windings 31, 32 becomes $\theta=180°$ and the voltage induced in the rotor windings 32 becomes $Ee^{j(180)}=-E$ whereby the current which has been circulating from the rotor windings 31 to the rotor windings 32 no longer flows and the motor no longer operates as an induction motor. It is at this point when the DC excitation windings 41, 42 provided respectively on the two stator cores start operating due to the closing of a switch SW2. That is, where the DC excitation windings 41, 42 are connected as shown in the figure with each other in series and when the direct current flows thereto from the DC current source 43 thereby producing static magnetic fields of eight poles, there are produced AC voltages e, ee$^j$ in the second rotor windings 33 and 34. Therefore, the current which flows in the second rotor windings 33, 34 follows in the direction towards the rectifier circuit 35 and the current rectified thereby flows to the first rotor windings 31, 32 through the diodes 36. The DC current causes to produce in the first rotor windings 31, 32 magnetic poles of four poles which, together with the four poles of the rotating magnetic fields produced by the stator windings 21, 22, allow producing a torque whereby the rotor enters into the synchronous rotation. Since the number of poles of the first rotor windings 31, 32 and that of the DC excitation windings 41, 42 are different from each other, there is no interference therebetween. Also, the number of poles of the stator windings 21, 22 and that of the DC excitation windings 41, 42 are different from each other so that there is no interference therebetween. Thus, the rotor is allowed to rotate as in a pure 4-pole conventional synchronous motor resulting in the strengthening of the synchronous torque of a motor (FIG. 2).

Next, operation of the motor when it steps out is considered. In case the motor steps out, there is an increase in the induced voltages E, $-$E in the first rotor windings 31, 32 due to the 4-pole rotating magnetic fields produced by the stator windings 21, 22. Due to these voltages, the rectified current flows to the first rotor windings 31, 32 through the diodes 36 and the rectifier circuit 35 and this prevents the progress of the step-out.

Further, consideration is given to the synchronous torque. Under synchronous operation, by means of the voltage phase shifting means, the phase of the rotating magnetic field produced by the stator windings 22 is shifted by 180° with respect to that by the stator windings 21. Thus, since the relative positions of the magnetic poles of the first rotor windings 35 and 32 formed by the rectified current flowing through the second rotor windings 33, 34, the rectifier circuit 35 and the diodes 36 due to the static magnetic fields produced by the DC excitation windings 41, 42 and the magnetic poles of the rotating magnetic fields by the stators 21, 22 exactly correspond with each other, the synchronous torques at the two rotor cores are directed in the same direction resulting in the added effect of these torques. Therefore, although the induction motor according to the present invention has two stators, the capacity in the sum is the same as that of a conventional induction motor having brushes.

In connection with the present embodiment, the voltage shifting means for providing a phase difference in the voltages induced in the rotor windings 31, 32 has been explained as having employed a method in which the connections of the stator windings 21, 22 are switched to electrically change the phase difference $\theta$ from $\theta=0°$ to $\theta=180°$. The DC excitation windings 41, 42, however, operate only during the synchronous operation so that, as the wiring connections have been made to meet such purpose in advance, there is no need to make changes in the connections by way of switching.

Figure 3A:
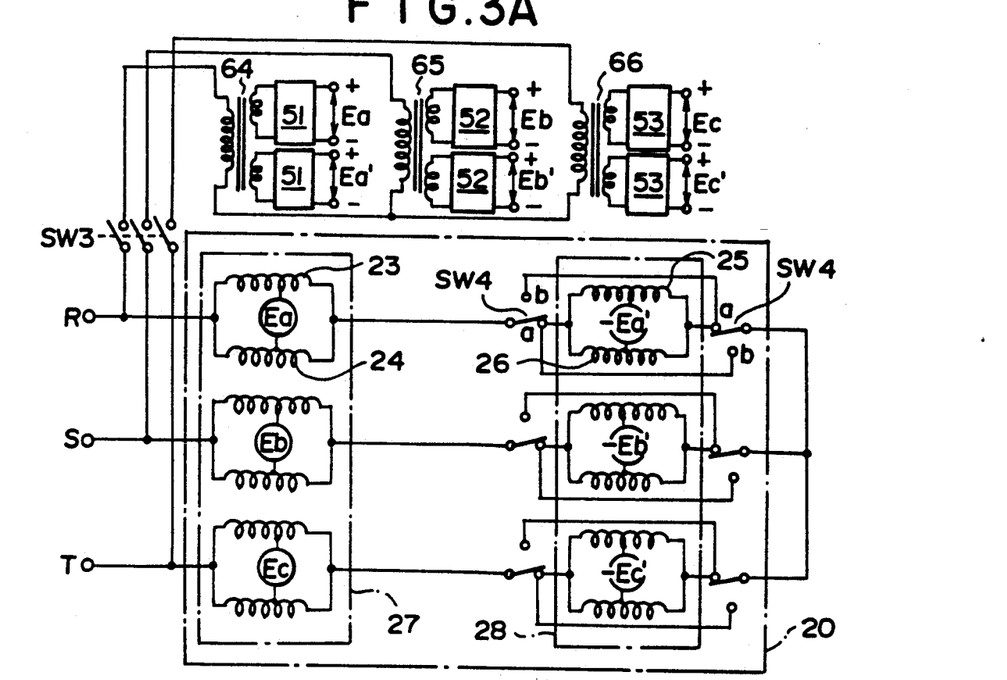
Figure 3B:
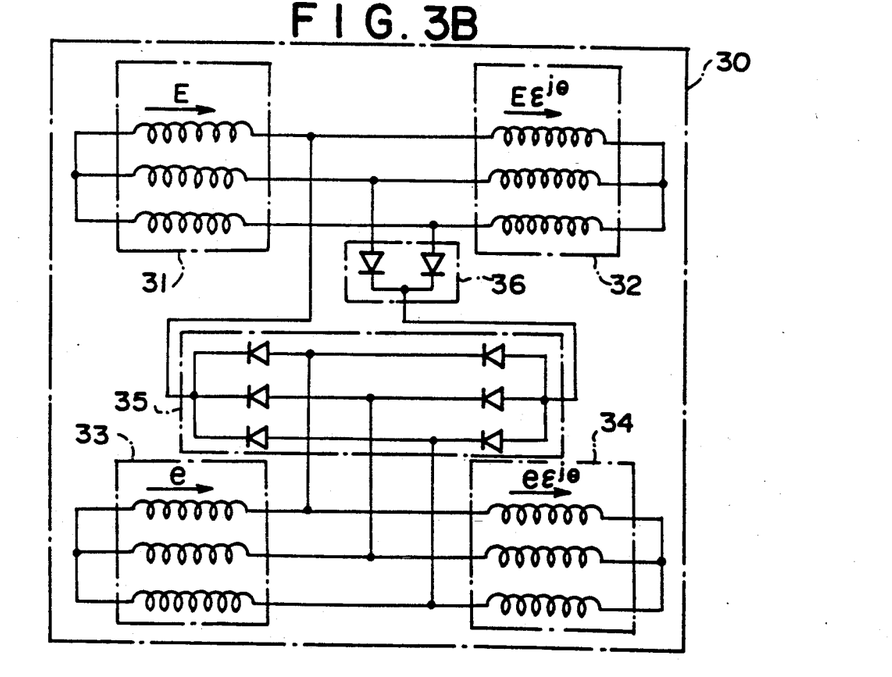

Now, explanation is made of a second embodiment of the invention with reference to FIG. 3. The same or like numerals or symbols are herein used for the same or like elements in the first embodiment. Numeral 20 represents the stator side of a dual-stator induction synchronous motor and the numeral 30 represents likewise the rotor side thereof.

At the stator side 20, there are provided stator windings 27 and 28 respectively on two stator cores. These windings 27 and 28 are in series Y-connection and connected respectively to three-phase AC power sources R, S and T. For the stator windings 27, 28, there are provided two windings per phase, hence windings 23, 24 and windings 25, 26, which are respectively connected in parallel. It is arranged such that excitation voltages Ea, $-$Ea' are respectively inputted to the per-phase two windings 23, 24 and 25, 26 at their intermediate positions. For the other phases, too, excitation voltages Eb, Ec and Eb', Ec' similarly inputted.

Examples of the excitation voltages inputted are those which are outputted as a result of having rectifier bridges 51, 52, 53 connected to the three-phase AC power supply sources R, S, T and the DC voltages outputted therefrom are used as such inputs. The rectifier bridges are connected to the three-phase power sources through a switch SW3 and transformers 64–66.

For the windings 25, 26 of the stator windings 28, there is provided a switch SW4 for changing the phase difference angle $\theta$ to $\theta=180°$ with respect to the stator windings 27.

On the other hand, the first rotor windings 31, 32 are respectively provided on the two rotor cores mounted on the common axis at the rotor side 30 and are connected in parallel. At the rotor side 30, second rotor windings 33, 34 are respectively provided on the two rotor cores and are connected in parallel.

The number of poles of the first rotor windings 31, 32 and the number of those of the stator windings 27, 28 are both identically four. Also, the number of poles of the second rotor windings 33, 34 and the number of poles of the magnetic fields produced by having the excitation voltages supplied to the intermediate portions of the two windings 23, 24 and 25, 26 per phase are identically eight. The same is true for other phases.

At the junction portions of the rotor windings which are disposed at a position between the two rotor cores, there is provided a rectifier circuit 35 which rectifies an output from the second rotor windings 33, 34. The rectifier circuit 35 has its output terminal at the DC current side connected to the first rotor windings 31, 32 through diodes 36.

Here, it is assumed that the voltage induced in the first rotor windings 31 facing the stator windings 21 is in the direction shown by an arrow E in FIG. 3 and, similarly, the voltage induced in the second rotor windings 33 is in the direction shown by an arrow e. Further, it is assumed that the voltage induced in the second rotor windings 32 facing the stator windings 28 is in the direction shown by an arrow $Ee^{j\theta}$ and, similarly, the voltage induced in the second rotor windings 34 is in the direction shown by an arrow $ee^{j\theta}$. Here, $\theta$ is a phase difference angle of the voltages.

Figure 4:
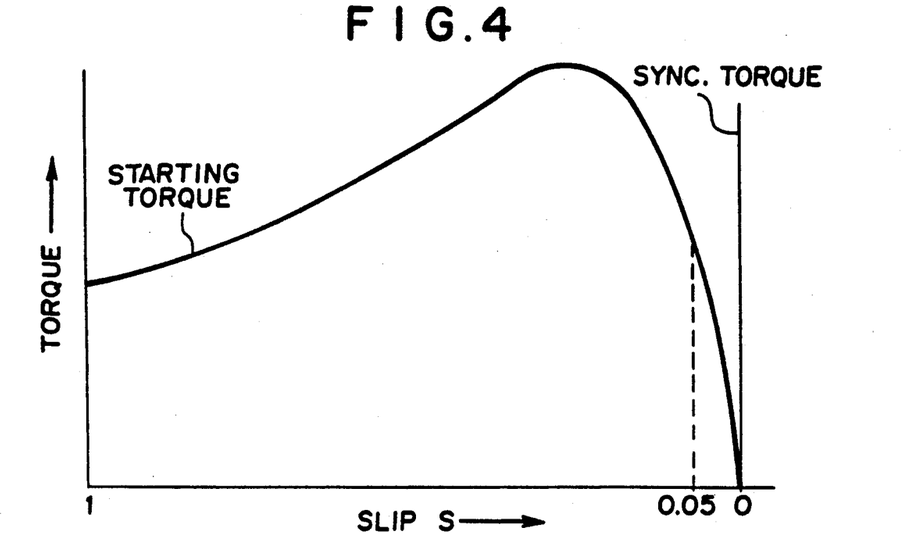
FIG. 4 is a torque characteristic curve of the motor shown in FIG. 3.

Now, how the motor having the above arrangement will operate is explained. First, for starting the motor, the three-phase AC power sources are switched on in the state in which the stator windings 31, 32 are connected (that is, the a-contact of the switch $SW_4$ is closed) such that the phase difference angle $\theta$ of the induced voltages in the first rotor windings 31, 32 is rendered to be $\theta = 0°$. In this way, the three-phase AC current flows to the stator windings 27, 28 from the three-phase AC power sources so that there are respectively produced rotating magnetic fields of the same phase and the voltages E, $Ee^{j\theta}$ are induced in the first rotor windings 31, 32. Since the phase difference angle $\theta$ is $\theta = 0°$ in the induced voltages, the current which flows in the first rotor windings 31, 32 circulates in both the windings and this causes the rotor to rotate and start the motor according to the principle of the ordinary induction motor (FIG. 4). Here, since the number of poles of the second rotor windings 33, 34 is eight and that of the stator windings 27, 28 is four, there are no interferences between them and hence the rotating magnetic fields generated by the stator windings 27, 28 produce no voltages in the second rotor windings 33, 34. Thus, the second rotor windings 33, 34 play no role in the start of the motor. That is, since the start of the motor is in the same characteristics as in a conventional induction motor, the starting torque is large and this is without requiring any such separate starting means as a starter.

After the start, the rotation speed of the rotor increases and, as it approaches the rotation speed of the rotating magnetic fields of the four poles produced by the stator windings 27, 28, that is the synchronous speed of the four poles, the slip S decreases and the induced voltages E in the first rotor windings 31, 33 become small. The operation up to this point is an operation as that of an induction motor but, when the slip S approaches $S = 0.05$, the operation changes to a synchronous operation. How this change takes place is explained hereunder.

First, by means of the voltage phase shifting means, the connections of one of the two stator windings 27 and 28, for example, the stator windings 28, are changed by the switch $SW_4$ from the a-contact to the b-contact so as to set the phase difference angle $\theta$ in the two rotating magnetic fields produced by the two stator windings 27, 28 to $\theta = 180°$. In this manner, the phase difference angle $\theta$ in the induced voltages in the first rotor windings 31, 32 becomes $\theta = 180°$ and the voltage induced becomes $Ee^{j(180)} = -E$ whereby the current which has been circulating from the rotor windings 31 to the rotor windings 32 no longer flows and the motor no longer operates as an induction motor.

Simultaneously with the operation of the switch $SW_4$, the magnetic fields of eight poles are caused to play their roles. That is, when the switch $SW_3$ is closed and the excitation voltages Ea, Eb, Ec, −Ea, −Eb, −Ec are applied at the respective intermediate portions between the two stator windings each having two windings provided per phase and connected in parallel with each other, there are produced static magnetic fields of eight poles since the voltages applied are DC voltages.

Here, since the voltages Ea, Eb, Ec and voltages −Ea, −Eb, −Ec applied respectively to the stator windings are of opposite polarities so that the phase difference $\theta$ of the rotating magnetic fields may be $\theta = 180°$, the phase difference angle $\theta$ of the AC voltages induced in the second rotor windings 33, 34 will also be $\theta = 180°$ and the induced voltages will be $ee^{j(180)} = -e$.

Therefore, the current which flows to the second rotor windings 33, 34 flows in the direction towards the rectifier circuit 35 and the current rectified flows to the first rotor windings 31, 32. The DC current causes to produce in the rotor windings 31, 32 magnetic fields of four poles which, together with the rotating magnetic fields of four poles produced by the stator windings 27, 28 allow producing a synchronous torque whereby the rotor enters into the synchrouous operation.

Since the number of poles of the first rotor windings 31, 32 and that of the static magnetic fields are different from each other, there is no interference therebetween. Also, the number of poles of the stator windings 27, 28 and that of the static magnetic fields are different from each other so that there is no interference therebetween. Thus, the rotor is allowed to rotate as in a pure 4-pole conventional synchronous motor resulting in the strengthening of the synchronous torque of a motor.

Japanese Patent Application Kokoku No. Hei 2(1990)-18,038 discloses an arrangement by which two magnetic fields having different numbers of poles are simultaneously produced in the same stator windings.

The induction synchronous motor according to the present invention has relevance to the arrangement as disclosed in the above publication in so far as the means for producing the two magnetic fields having different numbers of poles are concerned. However, the dual-stator induction synchronous motor according to the present invention has an additional advantage in that it has realized high torque induction starting.

Next, operation of the motor when it steps out is considered. In case the motor steps out, there is an increase in the induced voltages E, −E by the 4 pole rotating magnetic fields produced in the first stator windings 31, 32. Due to these voltages, the rectified current flows to the first rotor windings 31, 32 through the diodes 36 and the rectifier circuit 35 and this prevents the progress of the step-out.

Figure 5:
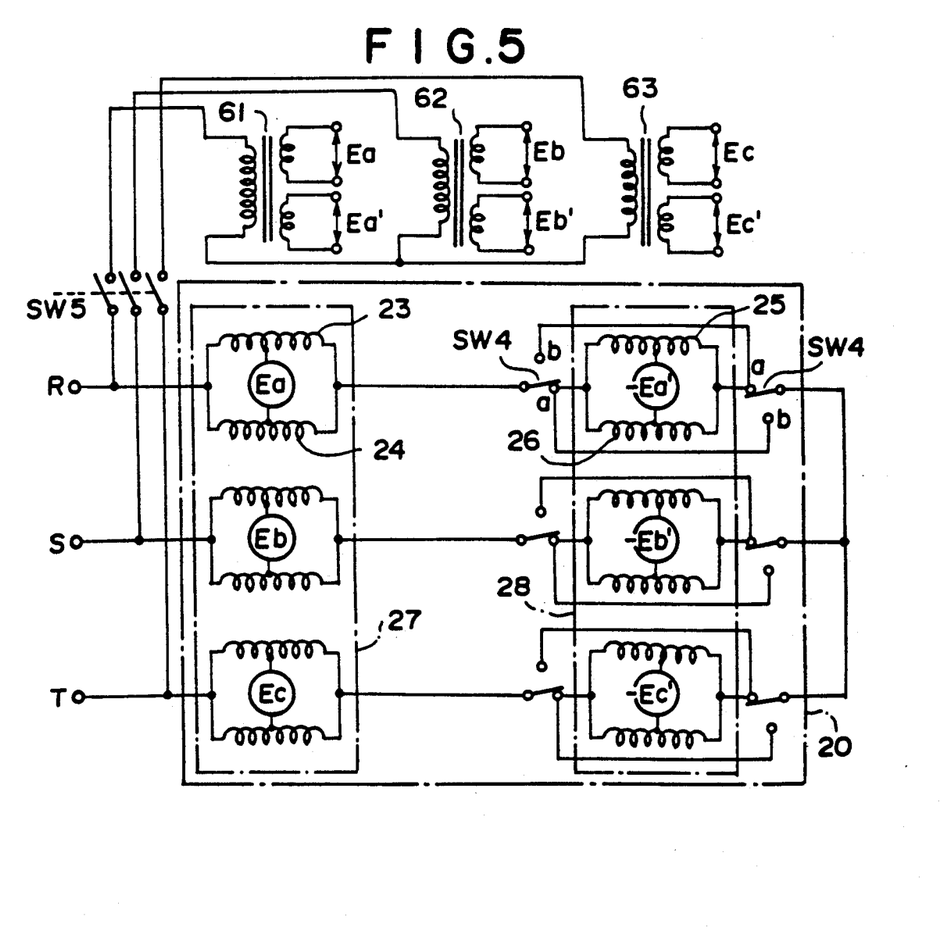
FIG. 5 is a diagram showing the stator windings side of the third embodiment of the invention.

Now, explanation is made of a third embodiment according to the present invention with reference to FIG. 5. As the rotor side of the motor represented is the same as that in the first and second embodiments, illustration and explanation therefor are omitted.

At the stator side 20, there are provided stator windings 27 and 28 respectively on two stator cores. These windings are in series Y-connection and connected respectively to three-phase AC power sources R, S and T.

For the stator windings 27, 28, there are provided two windings per phase, hence the windings 23, 24 and the windings 25, 26, which are respectively connected in parallel.

It is arranged such that AC voltages Ea, —Ea' having the same phase rotation as that of the four pole rotating magnetic fields are respectively inputted to the two perphase windings 23, 24 and 25, 26 at their intermediate portions. For the other phases, too, AC voltages Eb, Eb', Ec, Ec' are similarly inputted.

Examples of the AC voltages inputted are those which are outputted from transformers 61, 62, 63 connected to the three-phase power supply sources R, S, T. The transformers are connected to the three-phase power sources through a switch SW$_5$.

Now, how the motor having the above arrangement will operate is explained. First, for starting the motor, the switch SW$_5$ is opened and the switch SW$_3$ is changed so that the phase difference angle $\theta$ of the induced voltages in the first rotor windings 31, 32 is rendered to be $\theta=0°$. The explanation for starting the motor given for the first embodiment applies to this embodiment and the explanation here starts from the time when the motor enters into a synchronous operation.

First, by means of the voltage phase shifting means, the connections of one of the two stator windings 27 and 28, for example, the stator windings 28, are changed by the switch SW$_3$ so as to set the phase difference angle $\theta$ in the two rotating magnetic fields produced by the two stator windings 27, 28 to $\theta=180°$. In this manner, the phase difference angle $\theta$ in the induced voltages of the first rotor windings 31, 32 becomes $\theta=180°$ and the voltage induced becomes $Ee^{j(180)}=-E$ whereby the current which has been circulating from the rotor windings 31 to the rotor windings 32 no longer flows and the motor no longer operates as an induction motor.

Simultaneously with the operation of the switch SW$_4$, the magnetic fields of eight poles are caused to play their roles. That is, when the switch SW$_5$ is closed and the AC voltages Ea, Eb, Ec, —Ea', —Eb', —Ec' are applied at the respective intermediate portions of the stator windings having two windings per phase and connected in parallel, there are produced second rotating magnetic fields of eight poles since the voltages applied are AC voltages of the same phase. Here, the minus sign of —Ea' means that the phase difference $\theta$ with respect to Ea is 180°.

While rotating together with the first rotor windings 31, 32 having four poles, the second rotor windings 33, 34 intersect the second rotating magnetic fields of eight poles rotating at a different speed, thereby causing the second rotating magnetic fields to produce AC voltages in the second rotor windings 33, 34.

The phase difference $\theta$ of the AC voltages respectively induced in the second rotor windings 33, 34 will also become $\theta=180°$.

Therefore, the current which flows to the second rotor windings 33, 34 flows in the direction towards the rectifier circuit 35 and the current rectified flows to the first rotor windings 31, 32. The DC current causes to produce in the rotor windings 31, 32 magnetic fields of four poles which, together with the rotating magnetic fields of four poles produced by the stator windings 27, 28 allow producing a synchronous torque whereby the rotor enters into the synchronous rotation.

The second rotor windings 33, 34 explained above will, as shown in FIG. 6, rotate at the eight-pole synchronous speed. However, since they rotate together with the four-pole rotor windings in the neighborhood of four polesynchronous speed with the slip S=0, the rotor windings 33, 34 rotating in the neighborhood of S=0.5 (seen from the four-pole synchronous speed as reference) will have a power generating effect.

Figure 6:
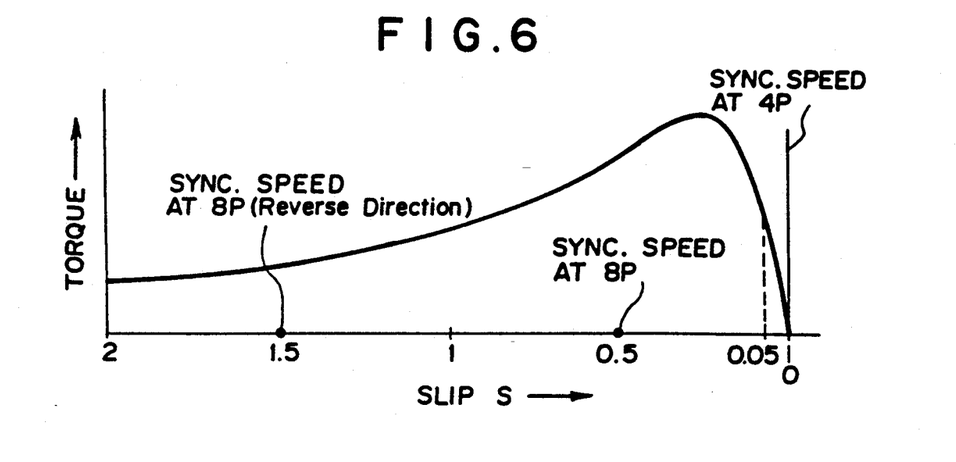
FIG. 6 is a torque characteristic curve of the motor shown in FIG. 5.

Here, the slip S represents that of the rotor with respect to the four-pole synchronous speed.

Figure 7:
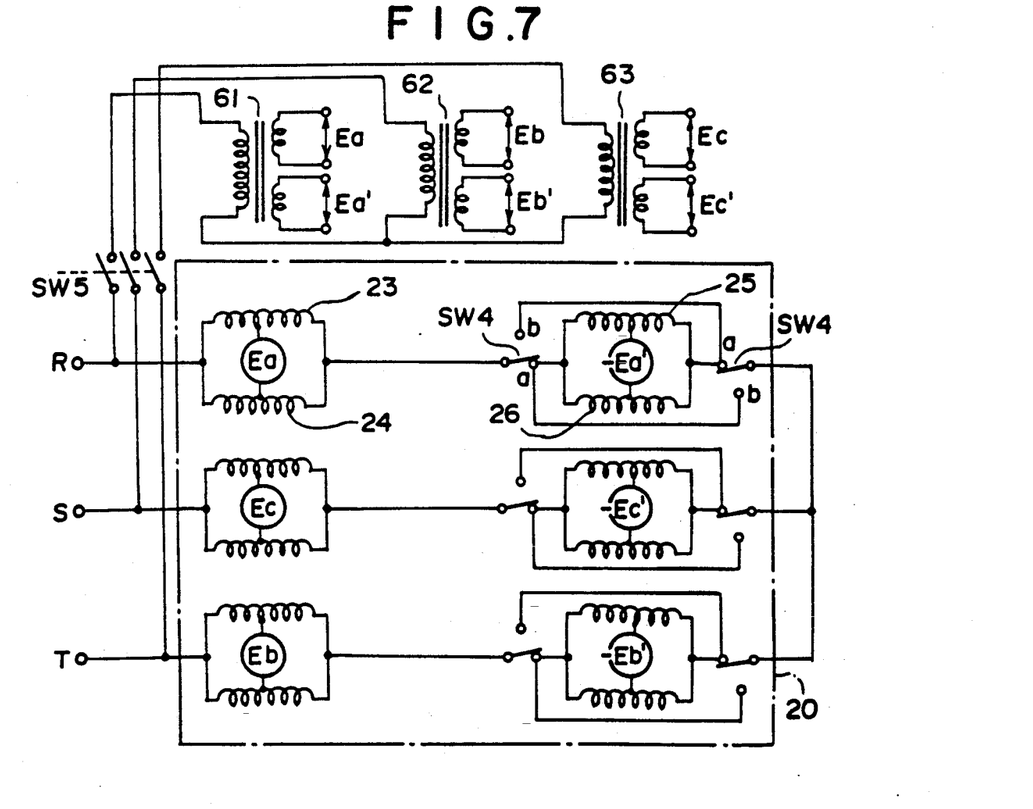
FIG. 7 is a diagram showing the stator windings side of the fourth embodiment of the invention.

FIG. 7 illustrates a fourth embodiment, for which the explanation here is limited to that for elements different from those in the third embodiment.

In the third embodiment, there are applied, between the intermediate portion of the windings 23 and that of the windings 24, the AC voltages of the same direction of the phase rotation as that of the four pole rotating magnetic fields. However, in this fourth embodiment, the voltages inputted are the AC voltages of the opposite direction of phase rotation with respect to the phase rotation of the four-pole rotating magnetic fields.

As shown in FIG. 7, the windings for being inputted the AC voltages Ea, Eb, Ec at the output side of the transformers 61, 62, 63 are replaced so that they are inputted for the phase rotation reversed from that of the four-pole rotating magnetic fields. That is, in this fourth embodiment, the AC voltages Eb and Ec and the AC voltages —Eb' and —EC' are respectively replaced with each other.

In this case, the second rotating magnetic fields produced by the inputting of the AC voltages Ea, Eb, Ec, and —Ea', —Eb', —Ec' are of eight poles.

As illustrated in FIG. 6, the slip S of the rotor for the four-pole synchronous speed will become S=1.5 since the number of poles is eight and the direction of the phase rotation is opposite to that of the four pole rotating magnetic fields.

Therefore, it is noted that, as compared with the third embodiment, the slip for the four-pole synchronous speed is large and the number of intersections between the second rotor windings 43, 44 and the second rotating magnetic fields of eight poles is increased, resulting in the enhancement of power generating effects.

Where the induced voltages in the rotor windings 33, 34 increase, the magnetic power of the four poles produced in the first rotor windings 31, 32 increases resulting in an increase in the synchronous torque.

In the motor according to the present invention, for preventing the interference between the rotating magnetic fields and the static magnetic fields (or the second rotating magnetic fields), the number of magnetic poles is assumed as a combination of four and eight poles but this number is not limitative.

Figure 8A:
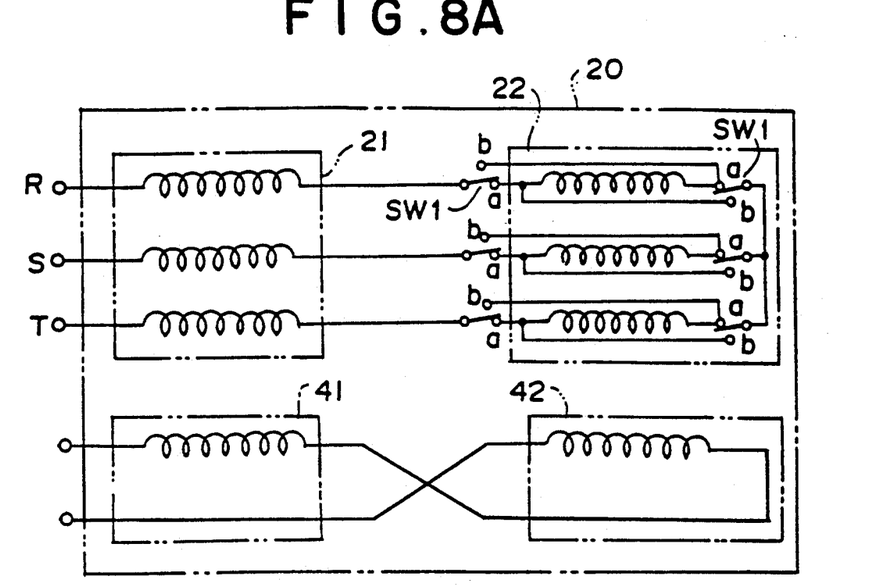
Figure 8B:
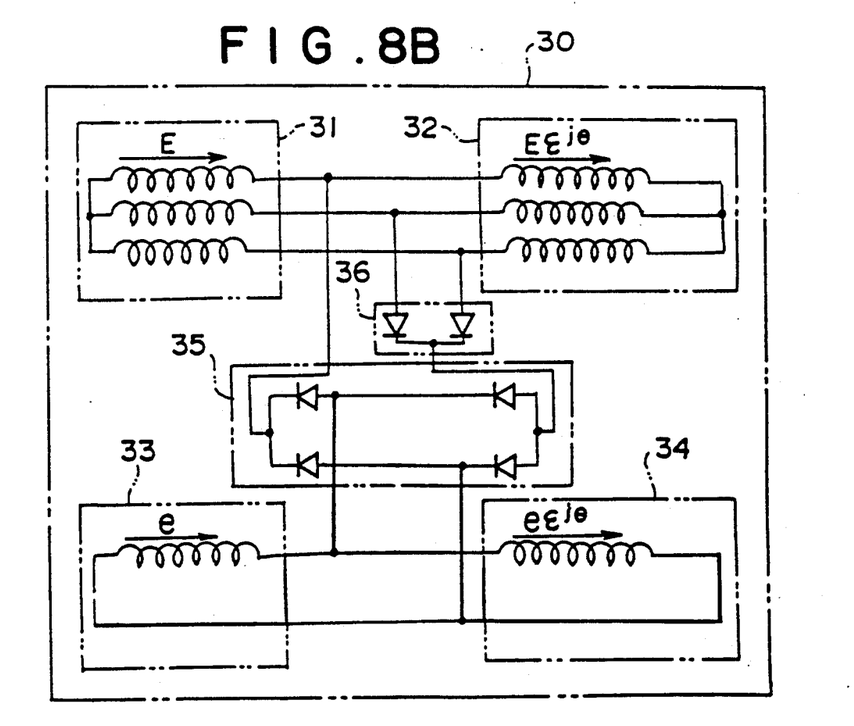

In the above respective embodiments, though the excitation windings and the second rotor windings are illustrated and explained as being poly-phase windings, they may be single-phase windings as illustrated in FIG. 8.

It is also to be noted that the power source used may be an AC power source of a commercial frequency, or a variable frequency power supply utilizing an invertor in which case a synchronous speed may be made variable as desired.

In the dual-stator induction synchronous motor according to the present invention, the starting operation is the same as that in a conventional induction motor and, from the time when the slip S approaches S=0.05, the speed changes to a synchronous speed and the motor operates with torque characteristics of a synchronous motor. This two-stator induction synchronous motor does not require brushes, which makes the construction and constitution of the motor simpler. Also, the motor is capable of operating at the start in the same torque characteristics as in an induction motor, which makes it possible for the motor to start even under a loaded condition and continue to the synchronous operation.

Since the motor according to the present invention is equipped with both the torque characteristics of an induction motor and those of a synchronous motor, it can operate with either of the torque characteristics. This means that, in case the motor undergoes a step-out for some reasons, it is possible to switch the operation from that with the synchronous torque characteristics to that with the induction torque characteristics so that, unlike in an ordinary synchronous motor, the motor may be prevented from suddenly stopping.

As explained above, the motor does not require brushes and makes the configuration simple and, further, is capable of operating with a large starting torque and a large synchronous torque.

While the invention has been described in its preferred embodiments, it is to be understood that the words which have been used are words of description rather than limitation and that changes within the purview of the appended claims may be made without departing from the true scope and spirit of the invention in its broader aspects.

We claim:

1. A dual-stator induction synchronous motor having two rotor cores mounted on a common axis with a predetermined space provided therebetween and two stator cores respectively facing said two rotor cores, said motor comprising:

a rotor having two first rotor windings of a predetermined number of poles provided respectively on said two rotor cores and two second rotor windings of a different number of poles with respect to the number of poles of said first rotor windings provided respectively on said two rotor cores, said two first rotor windings being connected together and said two second rotor windings being connected together between said two rotor cores;

two stators each having two stator windings provided respectively on said two stator cores and having a number of poles identical to the number of poles of said first rotor windings and two excitation windings provided respectively on said two stator cores having a number of poles identical to the number of poles of said second rotor windings;

rectifier means for rectifying voltages generated in said two second rotor windings based on magnetic fields produced by said two excitation windings during synchronous operation and for suppylying the rectified voltages to said two first rotor windings so that magnetic poles acting on rotating magnetic fields produced by said two stator windings are produced on said two rotor cores, said first rotor windings and said second rotor windings having connecting portions therebetween and said rectifier circuit being provided between said connecting portions; and phase shifting means associated with one of said two stator windings for producing a first phase difference for starting and acceleration operation and a second phase difference for synchronous operation between a rotating magnetic field produced around one of said rotor cores facing one of said two stators and a rotating magnetic field produced around the other one of said two rotor cores facing the other one of said two stators, said first phase difference being different from said second phase difference by 180°.

2. A dual-stator induction synchronous motor according to claim 1, in which said phase shifting means comprises a switch means for rendering the connections of stator windings of the stators to a reversed polarity.

3. A dual-stator induction synchronous motor according to claim 1, in which voltages supplied to said excitation windings are direct current voltages.

4. A dual-stator induction synchronous motor according to claim 1, in which said second rotor windings and said excitation windings are single-phase windings or poly-phase windings having the same number of poles.

5. A dual-stator induction synchronous motor having two rotor cores mounted on a common axis with a predetermined space provided therebetween and two stator cores respectively facing said two rotor cores, said motor comprising:

a rotor having two first rotor windings of a predetermined number of poles provided respectively on said two rotor cores and two second rotor windings of a number of poles twice the number of poles of said first rotor windings provided respectively on said two rotor cores, said two first rotor windings being connected together and said two second rotor windings being connected together between said two rotor cores;

two stators each having two stator cores respectively facing said two rotor cores and having two stator windings each having two windings provided per phase and connected in parallel with each other with these two stator windings being disposed respectively on said two stator cores and said two stator windings having a number of poles identical to that of said first rotor windings, said two windings each having at an intermediate portion thereof a excitation voltage input node;

an excitation voltage generating means for producing excitation voltages and supplying them to said excitation voltage input nodes of said stator windings;

rectifier means for rectifying outputs from said second rotor windings and supplying the rectified voltages to said first rotor windings, said first rotor windings and said second rotor windings having connecting portions therebetween and said rectifier circuit being provided between said connecting portions; and phase shifting means for producing phase differences of 180° between a rotating magnetic field produced around one of said rotor cores facing one of said two stators and a rotating magnetic field produced around the other one of said two rotor cores facing the other one of said two stators.

6. A dual-stator induction synchronous motor according to claim 5, in which said phase shifting means comprises a switch means for rendering the connections of stator windings of the stators to a reversed polarity.

7. A dual-stator induction synchronous motor according to claim 5, in which said excitation voltage generating circuit comprises transformers and rectifier circuits for supplying DC voltages to said excitation voltage input nodes of said stator windings.

8. A dual-stator induction synchronous motor according to claim 5, in which said excitation voltage generating circuit comprises insulating transformers for supplying AC voltages to said excitation voltage input nodes of said stator windings.

9. A dual-stator induction synchronous motor according to claim 8, in which the direction of phase rotation of said AC voltages supplied to said excitation voltage input nodes is opposite to that of the AC voltages supplied to said stator windings connected in parallel.

* * * * *

UNITED STATES PATENT AND TRADEMARK OFFICE
CERTIFICATE OF CORRECTION

PATENT NO. : 5,254,894

DATED : October 19, 1993

INVENTOR(S) : Toshihiko SATAKE and Yukio ONOGI

It is certified that error appears in the above-identified patent and that said Letters Patent is hereby corrected as shown below:

Column 9, line 63, delete "35" and insert --31--.

Signed and Sealed this

Twenty-ninth Day of November, 1994

Attest:

BRUCE LEHMAN

Attesting Officer

Commissioner of Patents and Trademarks